United States Patent [19]
Moore

[11] 3,773,404
[45] Nov. 20, 1973

[54] TELECENTRIC LENS
[75] Inventor: Duncan Thomas Moore, Rochester, N.Y.
[73] Assignee: Western Electric Company, Incorporated, New York, N.Y.
[22] Filed: June 30, 1972
[21] Appl. No.: 268,145

[52] U.S. Cl. ....... 350/226, 219/121 L, 350/175 TS, 350/206
[51] Int. Cl. ..................... G02b 9/16, G02b 13/22
[58] Field of Search ..................... 350/226, 175 TS, 350/206, 212

[56] References Cited
UNITED STATES PATENTS
3,419,321  12/1968  Barber et al. ........................... 350/8

FOREIGN PATENTS OR APPLICATIONS
411,322  6/1934  Great Britain ................ 350/175 TS Primary Examiner—John K. Corbin
Attorney—W. M. Kain et al.

[57] ABSTRACT

A multi-element, telecentric lens for use in a laser deflection system, or the like. The lens comprises a front plano-convex element, a center plano-concave element, and a rear plano-convex element all of specified aperture and radii of curvature. A laser beam entering the entrance pupil of the lens is brought to a focus at the image plane in such a manner that the chief ray, and hence the image cone, is normal to the image plane, regardless of the angle of the laser beam as it enters the entrance pupil of the lens.

1 Claim, 2 Drawing Figures

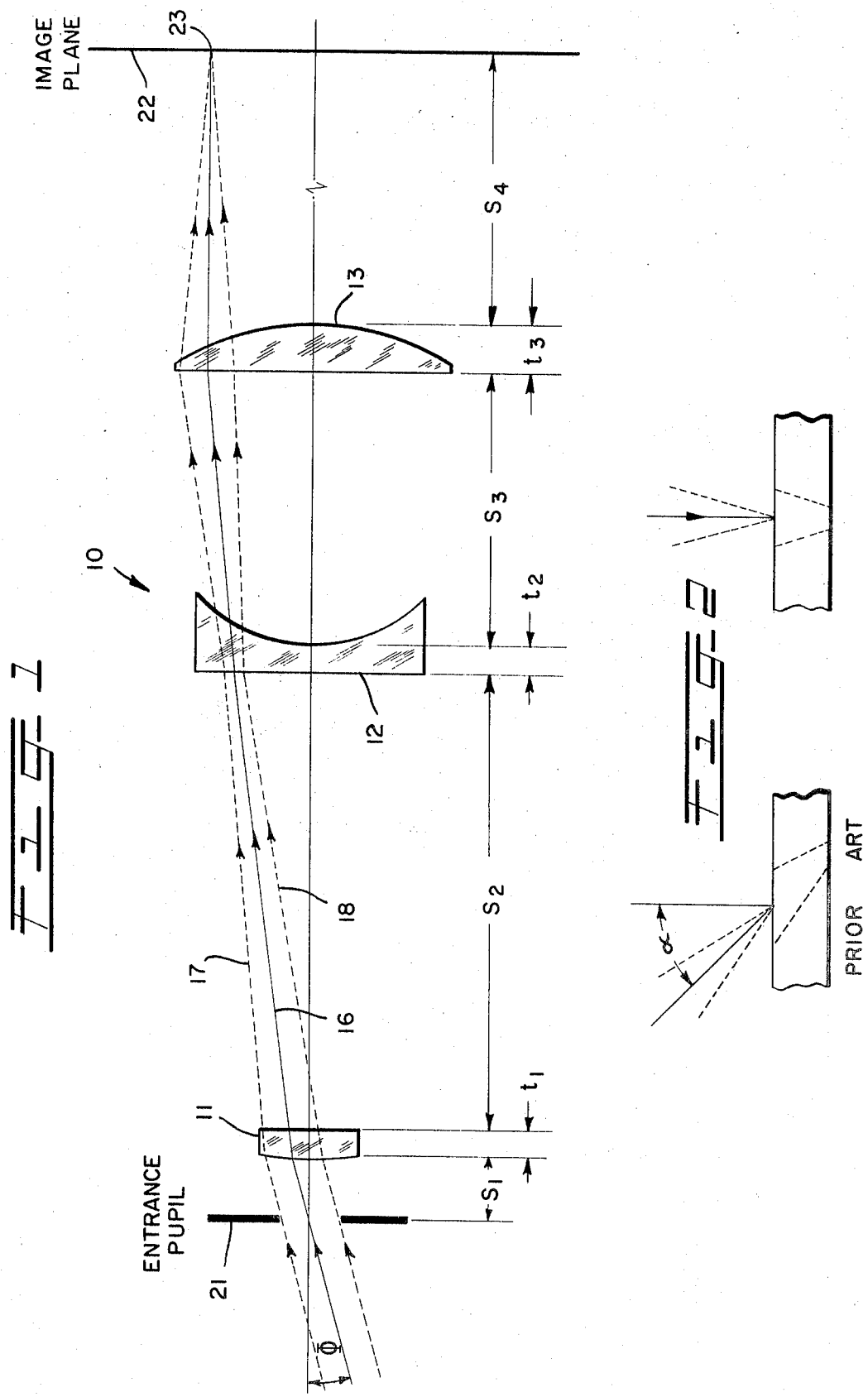

TELECENTRIC LENS

BACKGROUND OF THE INVENTION

1. Field of the Invention

Broadly speaking, this invention relates to optical lenses. More particularly, in a preferred embodiment, this invention relates to a multi-element, telecentric lens for use in laser deflection systems, or the like.

2. Description of the Prior Art

The optical maser, or laser, is finding increasing use in industry as a convenient and powerful tool for machining various kinds of workpieces. For example, the use of a laser to drill, scribe, weld, or evaporate workpieces has been widely reported in the literature.

One successful application of these techniques is in the formation of "vias," or through-holes, in the ceramic substrates which are used to manufacture multi-plane printed-circuit boards. Each such substrate may typically have several hundred "vias" drilled therethrough in a seemingly random pattern. To create these "vias" the workpiece is subjected to repeated applications of laser energy, while relative motion is provided between the laser and the workpiece between successive energizations of the laser.

One widely used technique for providing this relative motion is to use an apparatus of the type wherein the laser and its associated optics is stationary, while the workpiece to be drilled is fastened to the bed of an X-Y table positioned beneath the laser. In use, the X-Y table is indexed to the position that the first "via" will occupy and the laser fired. The X-Y table is then advanced to the next "via" position and the laser fired a second time. This process is repeated until the entire workpiece has been treated in the desired manner.

Because of the physical dimensions and mass of an X-Y table, the above-discussed technique tends to be slow and has an accuracy which is limited by the accuracy of the X-Y table. Accordingly, much attention has been given of late to alternative techniques wherein the workpiece is held stationary and the laser beam is deflected over the surface of the workpiece, by means of rotating mirrors or prisms, and the like.

Although faster and more accurate than the previously discussed technique, deflecting the laser beam over the surface of the workpiece introduces yet another problem, namely, the fact that the laser beam will no longer strike the surface of the workpiece at right angles. This, in turn, means that the "vias," or through-holes, which are created in the workpiece will themselves no longer be normal to the surface of the workpiece, an undesirable situation for virtually all applications. This problem is further compounded by the fact that the angle which the through-holes make to the surface of the workpiece is not even constant, and varies according to the degree of beam deflection.

The problem, then, is to provide an optical lens for use in a laser deflection system such that a laser beam passing through the lens will strike a workpiece normally positioned at the image plane of the lens, regardless of the angle that the laser beam makes to the lens as it enters the lens.

SUMMARY OF THE INVENTION

As a solution to the above problem, the instant invention contemplates a multi-element, telecentric lens comprising a first plano-convex lens element, a plano-concave lens element, and a second plano-convex lens element of specified aperture and radii, combined into a single lens.

The lens and its mode of construction will be more fully understood from the following detailed description, taken with the drawing, in which:

DESCRIPTION OF THE DRAWING

FIG. 1 is a cross-sectional view of a multi-element, telecentric lens according to the invention; and FIG. 2 illustrates the manner in which a laser beam strikes the surface of a workpiece in a prior art system, and in a system employing the lens according to FIG. 1.

DETAILED DESCRIPTION

FIG. 1 illustrates a telecentric lens 10 according to this invention. The lens comprises a first, plano-convex element 11, a plano-concave element 12 and a second plano-convex element 13. The mounts for the lens elements and the lens barrel have been omitted from the drawing as they are entirely conventional.

In FIG. 1, 16 represents the chief ray and 17 and 18 respectively represent the rays passing through the extreme upper and lower limits of the entrance pupil 21. The radius of curvature and thickness of each lens element, as well as the element-to-element spacing are set forth in Table I below.

TABLE I

| Element | Radius | Thickness ($t$) Air Space ($S$) | Clear Aperture |
|---|---|---|---|
| Entrance Pupil 21 | | $S_1$=1.8662cm | 2.0 cm |
| Lens Element 11 | $R_1$=+12.960cm | $t_1$=0.500cm | 2.5 cm |
| | $R_2$=∞ | $S_2$=15.86cm | |
| Lens Element 12 | $R_3$=∞ | $t_2$=1.00cm | 6.0 cm |
| | $R_4$=+4.9473 | $S_3$=9.520 | |
| Lens Element 13 | $R_5$=∞ | $t_3$=2.00 | 10.0 cm |
| | $R_6$=−8.8487 | | |
| Image Field | | | 9.4 cm Diameter |

In the lens as constructed, each lens element was fabricated from a high quality optical glass having an index of refraction of 1.50731 at $\lambda = 1.06\mu$, for example, Schott BK7 optical glass. The lens had a focal length of 47.3 centimeters, a full object field of 12°, and an $f$ number of 23.7.

For use with a laser deflection system the deflecting mirror, or prism, would be positioned at the entrace pupil 21. Thus, the incoming laser beam would be at some arbitrary angle $\phi$ to the optical axis, where −6° < $\phi$ <+6°. By definition, the chief ray 16 intercepts the optical axis at the entrance pupil 21 and this ray is refracted by lens elements 11, 12 and 13 to impinge upon the image plane 22 at 23. In like manner, rays 17 and 18, which are just able to pass through the entrance pupil, are refracted by the lens elements to strike image plane 22 at 23. Thus, the entering laser beam is focused to a fine point at the image plane.

As shown more clearly in FIG. 2, in a laser deflection system utilizing a conventional lens, the chief ray, and hence the image cone, will make an angle of $\alpha$ degrees to the plane of the workpiece, where −90°< $\alpha$ <+90°.

By way of contrast, in a system employing the lens shown in FIG. 1, the chief ray, and hence the image cone, is normal to the surface of the workpiece, regardless of the angle at which the laser beam enters the entrance pupil of the lens. Importantly, the lens shown in FIG. 1 does not require the use of any cemented elements which would, of course, be destroyed by the high laser energy levels involved in most laser machining applications.

The instant lens has been successfully employed with a YAG laser having a power output of at least 10 watts per an average, for example, to evaporate a gold film from a ceramic substrate. The diameter of the focused spot was <0.002 inches.

One skilled in the art will appreciate that lenses of different focal length may be obtained by scaling the design parameters given above in Table I, in the conventional manner, and such lenses are encompassed by the appended claim.

What is claimed is:

1. A telecentric lens comprising a front plano-convex element, a central plano-concave element, and a rear plano-convex element, said lens being constructed according to the technical data given herebelow, the foci, radii, apertures and thicknesses being given in centimeters, wherein $R_1$, $R_2$, $R_3$, $R_4$, $R_5$, and $R_6$ are radii of refractive surface curvatures, $t_1$, $t_2$, and $t_3$ are axial thicknesses of the front, central and rear lens elements, respectively, $n_1$, $n_2$, and $n_3$ are the refractive indices at $\lambda = 1.06\mu$ of the front, central and rear lens elements, respectively, $S_1$, $S_2$, $S_3$, $S_4$ are the entrance pupil-to-front element, front element-to-central element, central element-to-rear element, and rear element-to-image plane distances, respectively,

| Focal Length=47.3 | $f$=23.7 | Object Field=12° |
|---|---|---|
| $R_1$=+12.960 | | $t_1$=0.500 |
| $R_2$=∞ | | $t_2$=1.00 |
| $R_3$=∞ | | $t_3$=2.00 |
| $R_4$=+4.9473 | | $S_1$=1.8662 |
| $R_5$=∞ | | $S_2$=15.86 |
| $R_6$=−8.8487 | | $S_3$=9.520 |
| | | $S_4$=14.83 |
| $n_1$=1.50731, | $n_2$=1.50731, | $n_3$=1.50731 | and where the entrance pupil, front, central, and rear lens elements, and the image field have clear apertures of 2.0, 2.5, 6.0, 10.0, and 9.4 cms, respectively.

* * * * *